United States Patent
MacKenzie et al.

(10) Patent No.: US 7,447,506 B1
(45) Date of Patent: Nov. 4, 2008

(54) APPARATUS AND METHOD FOR REDUCING NETWORK CONGESTION

(75) Inventors: Andrew MacKenzie, Boronia (AU); Anthony Hunter, Wantirna (AU); Paul J. Lima, San Jose, CA (US)

(73) Assignee: Good Technology, Inc., Santa Clara, CA (US)

( * ) Notice: Subject to any disclaimer, the term of this patent is extended or adjusted under 35 U.S.C. 154(b) by 515 days.

(21) Appl. No.: 10/109,741

(22) Filed: Mar. 29, 2002

(51) Int. Cl.
*H04Q 7/20* (2006.01)

(52) U.S. Cl. .................. 455/453; 455/442; 455/436; 370/332

(58) Field of Classification Search .......... 455/436–453, 455/524–525; 370/310, 331–333
See application file for complete search history.

(56) References Cited

U.S. PATENT DOCUMENTS

| | | | | |
|---|---|---|---|---|
| 4,670,899 A | * | 6/1987 | Brody et al. | 455/453 |
| 5,241,685 A | * | 8/1993 | Bodin et al. | 455/453 |
| 5,267,261 A | * | 11/1993 | Blakeney et al. | 370/332 |
| 5,355,514 A | * | 10/1994 | Borg | 455/423 |
| 5,379,448 A | * | 1/1995 | Ames et al. | 455/524 |
| 5,629,975 A | * | 5/1997 | Tiedemann et al. | 455/435.1 |
| 5,640,414 A | * | 6/1997 | Blakeney et al. | 375/130 |
| 5,867,786 A | * | 2/1999 | Ishi | 455/436 |
| 6,038,448 A | * | 3/2000 | Chheda et al. | 455/436 |
| 6,055,433 A | * | 4/2000 | Yuan et al. | 455/453 |
| 6,185,423 B1 | * | 2/2001 | Brown et al. | 455/434 |
| 6,195,552 B1 | * | 2/2001 | Jeong et al. | 455/436 |
| 6,317,600 B1 | * | 11/2001 | Salonaho et al. | 455/453 |
| 6,324,403 B1 | * | 11/2001 | Jalloul | 455/453 |
| 6,507,740 B2 | * | 1/2003 | Shi | 455/437 |
| 6,625,451 B1 | * | 9/2003 | La Medica et al. | 455/434 |
| 6,704,571 B1 | * | 3/2004 | Moon | 455/436 |
| 6,907,243 B1 | * | 6/2005 | Patel | 455/442 |
| 6,968,192 B2 | * | 11/2005 | Longoni | 455/453 |
| 7,016,686 B2 | * | 3/2006 | Spaling et al. | 455/453 |
| 7,099,674 B2 | * | 8/2006 | Diao et al. | 455/453 |
| 7,177,649 B1 | * | 2/2007 | Nielsen | 455/453 |
| 2002/0142788 A1 | * | 10/2002 | Chawla et al. | 455/504 |
| 2002/0147022 A1 | * | 10/2002 | Subramanian et al. | 455/453 |
| 2002/0150063 A1 | * | 10/2002 | Tran | 370/332 |
| 2003/0129979 A1 | * | 7/2003 | Cooper | 455/432 |

\* cited by examiner

*Primary Examiner*—Sharad Rampuria
(74) *Attorney, Agent, or Firm*—Blakely Sokoloff Taylor & Zafman, LLP

(57) ABSTRACT

A method is described comprising: defining a base station congestion condition; detecting that the congestion condition is met with respect to a first base station and allocating a wireless device to an alternate base station instead of the first base station in response to the congestion condition being met, as long as RSSI measured from the alternate base station is above a predetermined alternate base station threshold ("ABT") value.

25 Claims, 5 Drawing Sheets

APPARATUS AND METHOD FOR REDUCING NETWORK CONGESTION

BACKGROUND

1. Field of the Invention

This invention relates generally to the field of wireless network protocols and processes. More particularly, the invention relates to an apparatus and method for reducing congestion on a wireless network.

2. Description of the Related Art

A variety of wireless data processing devices currently exist including standard cellular phones, cellular phones equipped with data processing capabilities, wireless personal digital assistants ("PDAs") such as the Palm® VIIx handheld, and, more recently, corporate wireless messaging devices such as the Blackberry™ wireless pager developed by Research In Motion ("RIM").™

In operation, some of these wireless devices will attempt to lock on to a base station from which it receives the highest signal strength, commonly referred to as the Received Signal Strength Indication ("RSSI"). Referring to FIG. 1, the wireless device 120 will periodically evaluate the RSSI received from each of a plurality of surrounding base stations 110-112 and will generally select the base station having the highest RSSI value. Accordingly, a device in motion (e.g., in a car during a user's daily commute) will tend to jump from one base station to another based on the continually changing RSSI values. For example, if base station 110 is close to the user's home, the user's wireless device 120 may initially lock on to that base station 110 when the user leaves for work, based on the strength of the RSSI value (identified as "RSSI 1"). As the user commutes to work, however, the wireless device 120 may jump to a new base station 112 as the RSSI value received from that base station 112 (identified as RSSI 3) become greater than the initial RSSI value by some predefined margin.

Because each wireless device is programmed to select a base station based on RSSI, certain powerful 'wide-area' base stations located in highly populated areas may tend to become overloaded (e.g., such as those located near the intersection of several major freeways or high-rise office buildings). This can be so despite the addition of dedicated 'campus' bases, which don't always attract the localised devices they are meant to serve, due to their lower output power. This problem is graphically illustrated in FIG. 2 which shows three coverage areas 210, 220, and 230 associated with three base stations 211, 221, and 231, respectively. Area 240 falls within the coverage areas of all three base stations. However, if RSSI values within area 240 measured from base station 231 are higher than RSSI values measured from the other two base stations 211 and 221, then wireless devices will tend to select base station 231 from within area 240. If area 240 is significantly more populated than surrounding areas, this may cause base station 231 to become overloaded. In this situation, it would be desirable to reallocate a certain number of devices to the alternate base stations 211 and 221.

Accordingly, what is needed is an improved base station selection algorithm for a wireless device. What is also needed is a selection algorithm which will factor in variables other than RSSI when making base station selection decisions (e.g., such as the current load on each base station).

SUMMARY

A method is described comprising: defining a base station congestion condition; detecting that the congestion condition is met with respect to a first base station and allocating a wireless device to an alternate base station instead of the first base station in response to the congestion condition being met, as long as RSSI measured from the alternate base station is above a predetermined alternate base station threshold ("ABT") value.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Device Architecture

Figure 1:
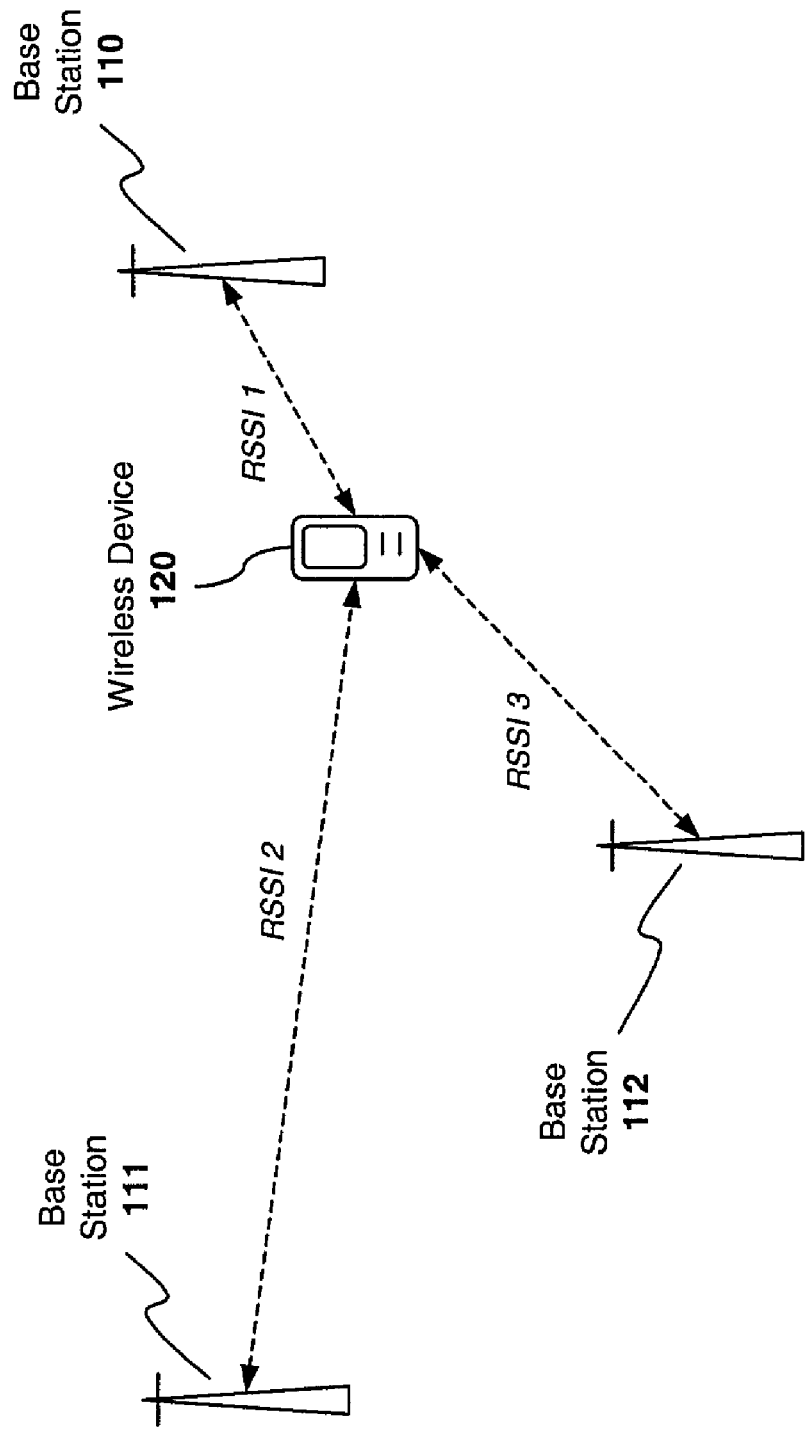
FIG. 1 illustrates base station roaming techniques based on RSSI values.
Figure 2:
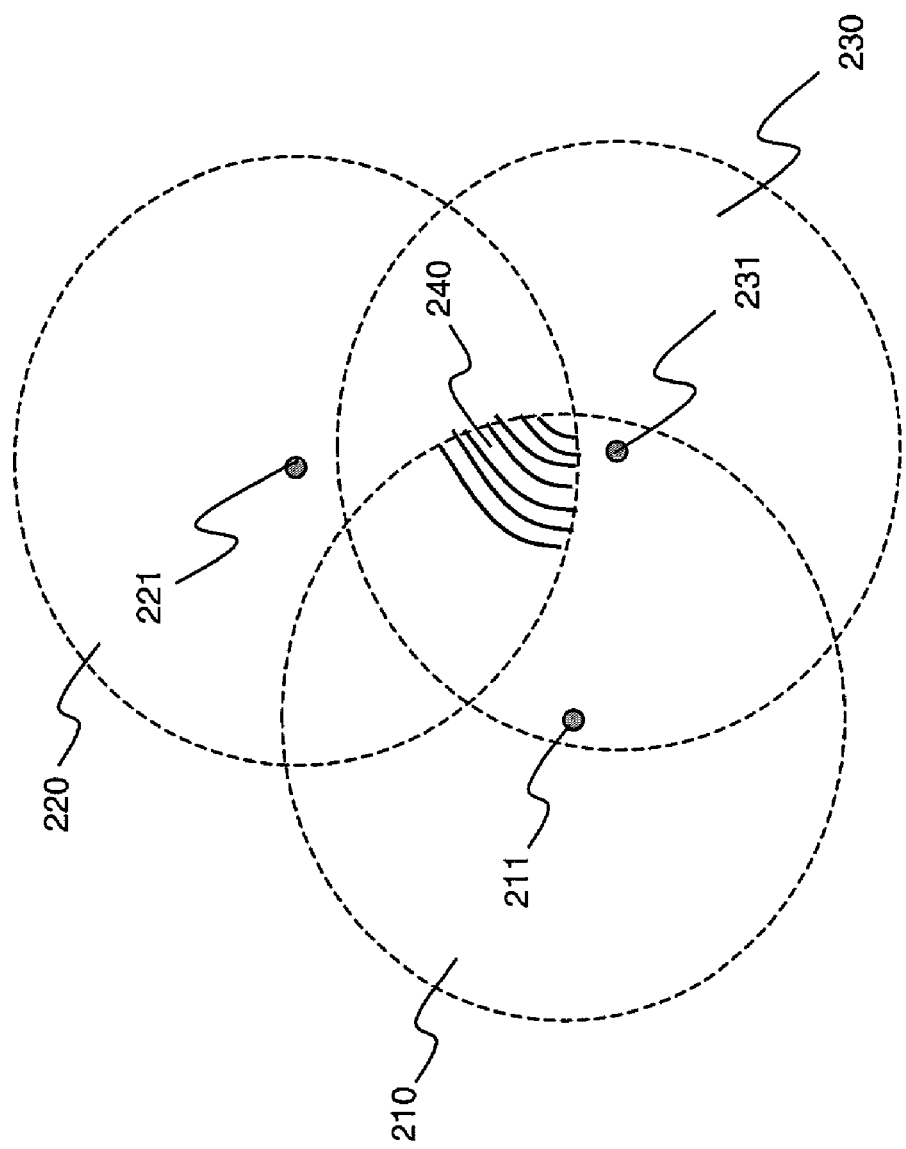
FIG. 2 illustrates a coverage area serviced by three different base stations on a wireless network.
Figure 3:
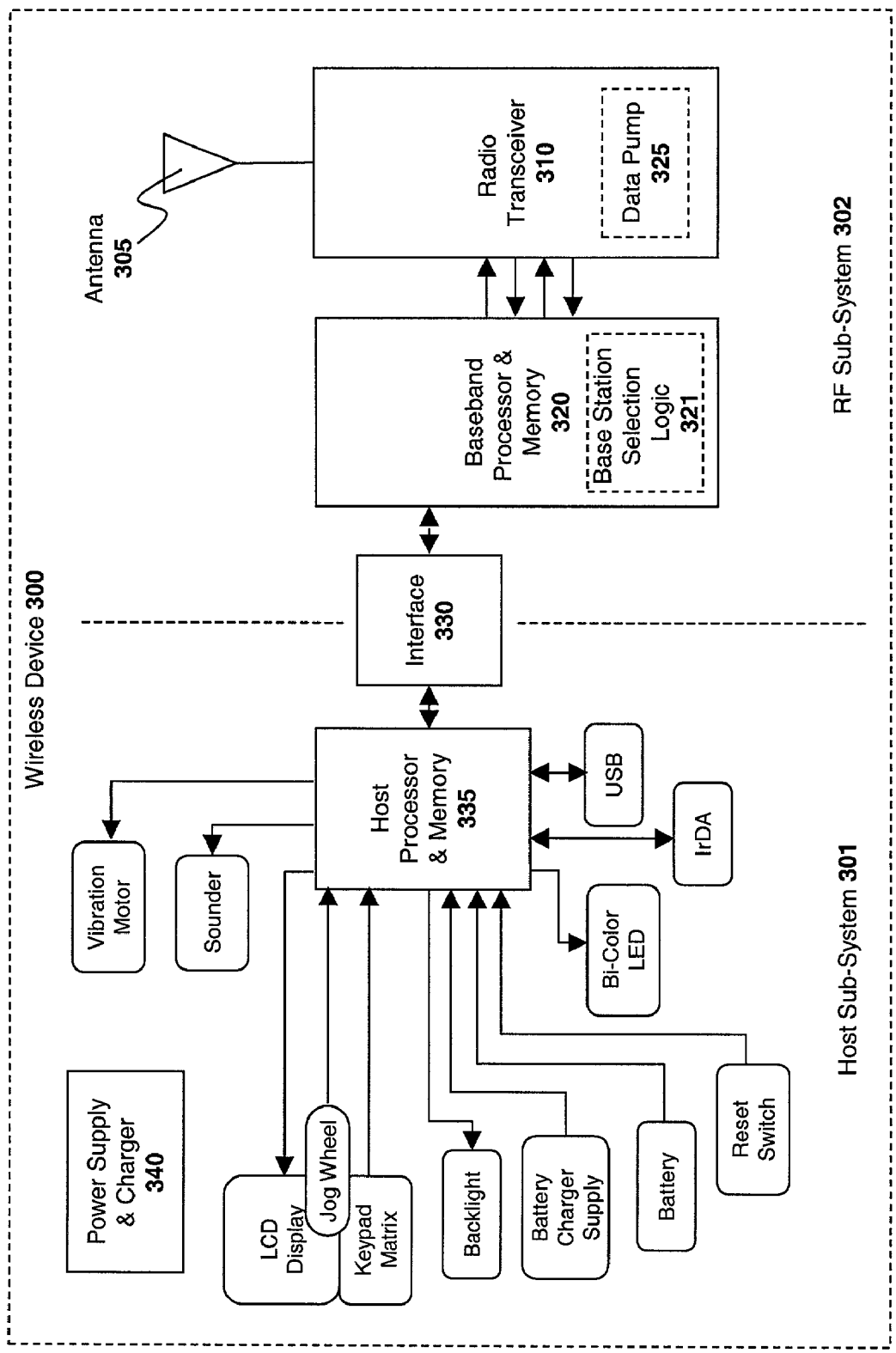
FIG. 3 illustrates a wireless device architecture according to one embodiment of the invention.

An exemplary wireless device architecture 300 on which embodiments of the invention are implemented is illustrated in FIG. 3. As illustrated, this embodiment is comprised generally of a Host subsystem 301 and an RF subsystem 302 which communicate via an interface 330. The Host subsystem 301 is comprised of a Host processor and memory 335 for executing program code and operating on data. For example, in one embodiment, the processor and memory 335 are responsible for running the wireless device's operating system, user interface and/or any applicators installed on the device. In one embodiment, the Host processor is comprised of an ARM® core micro-controller (e.g., such as the L7210 from Linkup Systems which uses an ARM720T core). However, various other processors may be employed while still complying with the underlying principles of the invention. One embodiment of the Host subsystem 301 may also include a non-volatile memory (not shown), such as an EEPROM or Flash memory, for storing program code and data when the device is powered off.

As indicated in FIG. 3, the Host subsystem 301 may also include a power supply/charger unit 340 and various I/O and/or user interface elements 350 (e.g., an LCD display, a keypad, a USB port, an IrDA port, to name a few).

The RF subsystem 302 is responsible for transmitting and receiving data over the wireless network 271. Accordingly, one embodiment of the RF subsystem 302 is comprised of a baseband processor and memory 320 for implementing a particular network protocol supported by the network 271 (e.g., such as the Mobitex protocol). In one embodiment, the baseband processor 320 is comprised of base station selection logic for implementing the advanced base station selection techniques described herein. In one embodiment, the baseband processor core is the Z183 micro-controller manufactured by Zilog, Inc. However, the underlying principles of the invention are not limited to any particular baseband processor. In addition, although illustrated above as a dual processor system, the underlying principles of the invention may also be implemented on a single processor architecture. The data pump 325 of one embodiment encodes/decode the transmitted/received signal according to the particular modulation techniques employed by the radio transceiver 310.

Embodiments of the Invention

Figure 4:
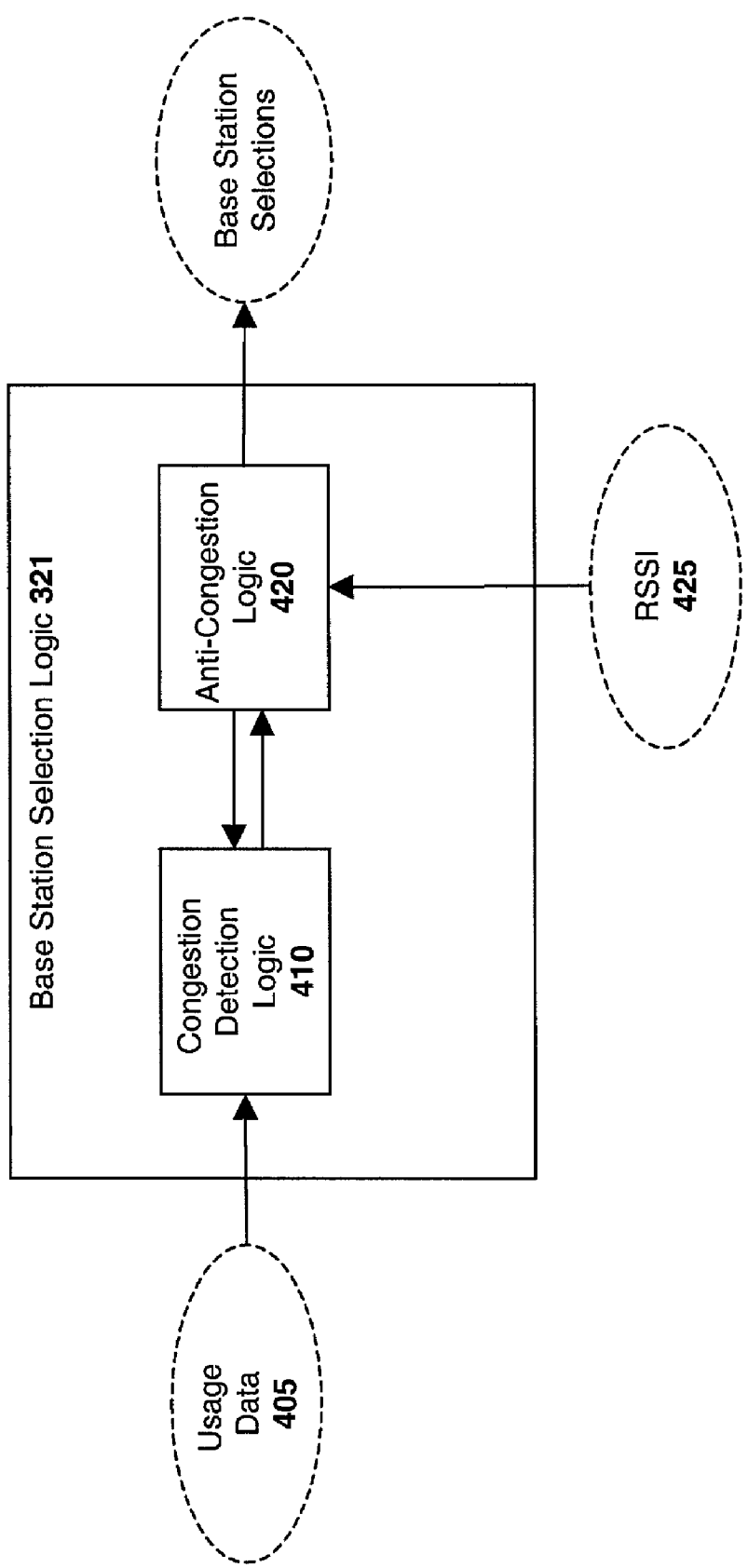
FIG. 4 illustrates base station selection logic according to one embodiment of the invention.
Figure 5:
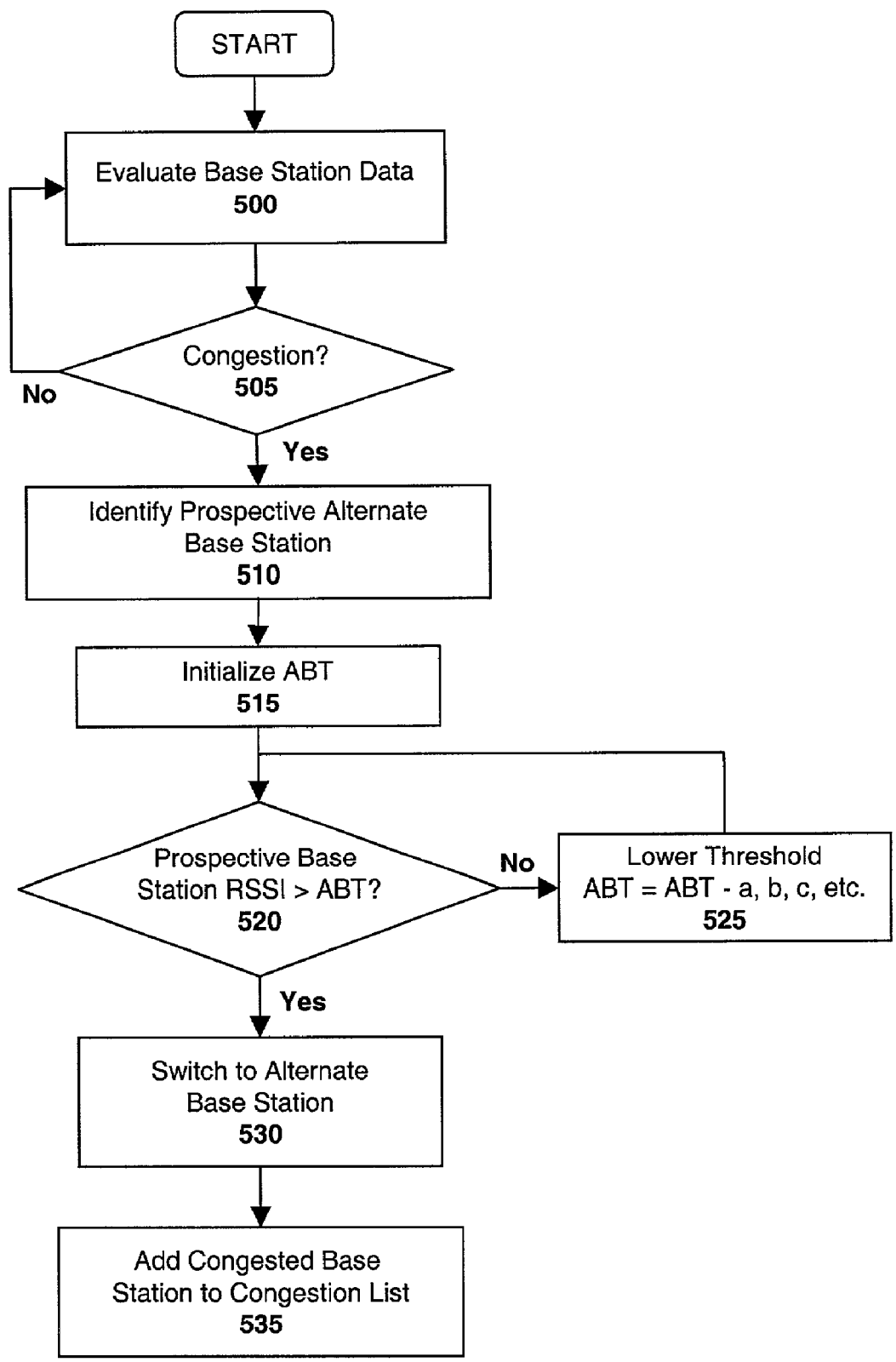
FIG. 5 illustrates a base station selection process according to one embodiment of the invention.

In one embodiment of the invention, the base station selection logic 321 evaluates the approximate traffic load on the base station it is operating on in addition to the RSSI of the surrounding bases when determining which base station to select. As illustrated in FIG. 4, in one embodiment, the base station selection logic is comprised of congestion detection logic 410 to evaluate and identify congestion conditions, and anti-congestion logic 420 to employ the anti-congestion techniques described herein. This embodiment will be described with reference to the base station selection process outlined in FIG. 5.

At 500, the congestion detection logic 410 evaluates base station usage data 405 to determine whether a particular base station is congested. In one embodiment, "congestion" is declared when the number of wireless devices serviced by a particular base station averaged over a period of time exceeds a predetermined threshold value. Various techniques may be employed to detect probable congestion including determining (or at least approximating) the amount or volume of traffic in either direction to or from the base, traffic routing delays or the number of wireless devices for which there is pending traffic on a base station. In a Mobitex network, for example, wireless devices maintain network contact by periodically listening for a synchronization packet which (among other things) contains a variable referred to as "TrafNum" which indicates the number of wireless devices operating in Battery Savings mode which the base intends to send packets to within the next cycle (e.g., 10 seconds). In one embodiment, a base station is considered "congested" if the Trafnum value is above a specified threshold. Alternatively, in one embodiment, if the average TrafNum value, averaged over the last 'z' TrafNum values received, exceeds a specified value, 'y,' the congestion detection logic 410 indicates a congestion condition. Various alternate criteria for defining a congestion condition may be employed while still complying with the underlying principles of the invention.

The congestion detection logic 410 notifies the anti-congestion logic 420 of a detected congestion condition if one exists (determined at 505). In response, the anti-congestion logic 420 attempts to locate an alternate base station having an RSSI value above some minimum threshold value, referred to herein as the "Alternate Base Threshold" or "ABT." At 510, one or more prospective alternate base stations are identified. In one embodiment, the initial prospective alternate base station is the one with the strongest initial RSSI value. At 515, the anti-congestion logic 420 initializes the ABT value. In one embodiment, the initial ABT value is 49 dBuV; however, the principles of the invention are not limited to any particular initial or subsequent ABT values.

One purpose of the ABT is to ensure that devices with the best alternate neighbors roam off the congested base before devices that have poorer neighbors. For example, given the option, it would be preferred that a device with a neighbor whose RSSI is 45 dBuV roams off the congested base to that neighbor before a device whose best neighbor is only 35 dBuV. It also ensures that devices remain on the congested base if that is the only workable base they can see and/or they have very poor neighbors. This keeps the fleet as optimally distributed as possible and prevents excess roaming.

At 520, the anti-congestion logic 420 compares the ABT with the RSSI value read from the prospective base station. In one embodiment, if the RSSI of the prospective base station exceeds the ABT, the wireless device roams to that base station (at 530). In one embodiment, the wireless device switches to the new base station after a random timeout between immediately and 75% of the time until when the wireless device is next scheduled to receive a synchronization packet (known as "SVP6" on a Mobitex network). Switching to the new base station only after a random timeout prevents a significant number of wireless devices from switching to the new base station at the exact same moment and potentially overloading the new base station.

In one embodiment, the wireless device cancels the anti-congestion roam if it happened to be addressed in the Traffic or Mail Lists of the last synchronization packet it received, or if the Host subsystem has data for the RF subsystem to send to the network. In other words, only when the device would have otherwise entered and stayed in standby mode does it schedule the anti-congestion roam.

In one embodiment, if the RSSI of the prospective base station does not exceed the ABT (determined at 520), then the anti-congestion logic 420 decreases the ABT by a specified amount (at 525). In one embodiment, the anti-congestion logic 420 initially decrements the ABT relatively quickly (e.g., each time the wireless device receives a synchronization packet), because it is not likely that many devices will have neighbors with extremely high RSSI. Once the ABT reaches certain specified values, the anti-congestion logic 420 then decrements the ABT at intervals further and further apart. As the ABT gets lower and lower more and more devices will find themselves with neighbors whose RSSI exceeds the ABT. Slowing down the lowering of ABT prevents a mass exodus of the congested base and allows time for the system to settle down gracefully.

For example, in one embodiment, the anti-congestion logic 420 decreases the ABT by 1 at each synchronization point from 49 dBuV until it reaches 45 dBuV. When the ABT reaches 45 dBuV the anti-congestion logic 420 decrements it every 'a' minutes until it reaches 40 dBuV. When the ABT reaches 40 dBuV the anti-congestion logic 420 decrements it every 'b' minutes until it reaches 35 dBuV. When the ABT reaches 35 dBuV the anti-congestion logic 420 decrements it every 'c' minutes until it reaches 30 dBuV (and so on). In one embodiment, the ABT is not reduced below 30 dBuV.

In one embodiment, if the wireless device roams to the prospective base station (at 530), the congested base station is added to a "Congestion List" maintained on the wireless device (e.g., stored in the baseband processor memory). The wireless device will not attempt to roam to any channel which is on the Congestion List, during either normal or quick channel monitoring. Maintaining a Congestion List in this manner will prevent large groups of devices from continually jumping back and forth between congested and not-congested base stations.

List maintenance may be performed to ensure that the Congestion List is up-to-date. For example, in one embodiment, a base station entry remains in the congestion list for as long as its channel is detectable by the wireless device (i.e., as long as it is present in the "Neighbor List" of available surrounding bases (sent by the network to the wireless device). Once the wireless device receives a Neighbor List without that channel, the channel is to remain in the Congestion List for a further 't' minutes. If the 't' minutes expires and the channel is still absent from the congestion List, it is removed from the Congestion List. If the channel reappears in the Neighbor List while the 't' minute timer is running, the timer is cancelled and not re-started until the channel disappears from the Neighbor List again. In one embodiment, the Congestion List is preserved across power cycles. It is cleared after two full passes of all channels during quick channel monitoring (the Mobitex term for looking for bases while out of coverage).

The purpose of linking the Neighbor List to the Congestion List as described above is to prevent a channel from remaining off limits when that would not be appropriate. For spectrum efficiency, base station channels (frequencies) are reused in different geographical areas. If the device travels far enough away from the neighborhood containing the congested base, the device may find itself in an area using the same channel as that of the congested base. If that channel was not removed from the Congestion List the device would be uneccessarily restricting it's available coverage options.

One embodiment of the Congestion List allows up to 4 entries. In one embodiment, if the list is full the oldest entry is overwritten.

When average number of devices (identified by "TrafNum" on a Mobitex network) falls below the predetermined threshold value, 'x' the anti-congestion algorithm is disabled.

In one embodiment, if any UPFREQ FBI values in the Neighbor List are non-zero, the algorithm is disabled. That is, in this embodiment, Priority Roaming (a feature of Mobitex) and Anti-Congestion Roaming are mutually exclusive.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while described above in the context of the Mobitex protocol, the underlying principles of the invention may be implemented on virtually any wireless network.

It is also important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include, but are not limited to, computer readable media having a VHSIC Hardware Description Language ("VHDL") description, a Register Transfer Level ("RTL") netlist, and/or a GDSII description with suitable information corresponding to the described apparatus and method.

Accordingly, the scope and spirit of the invention should be judged in terms of the claims which follow.

What is claimed is:

1. A method implemented on a wireless device for distributing a load across two or more base stations comprising:
   determining if a received signal strength ("RSSI") value from a first base station is greater-than a RSSI value received from a second base station;
   determining if a traffic load on said first base station is congested;
   selecting the first base station if it is determined that the RSSI value from the base station is higher than the RSSI value from the second base station; and
   selecting the second base station if said RSSI value from said first base station is higher than said RSSI value from said second base station, and it is determined that the first base station is congested as determined by a number of wireless devices serviced by the first station over a period of time exceeding a predetermined threshold value;
   wherein said congestion detection logic determines said average load based on TrafNum values read from synchronization packets.

2. The method as in claim 1 wherein selecting further comprises:
   determining if an average load on said first base station over the period of time is above the threshold value; and
   selecting said second base station if said average load is above said threshold value.

3. The method as in claim 1 further comprising:
   selecting said second base station only if said RSSI of said second base station is above an alternate base station threshold ("ABT") value.

4. The method as in claim 3 further comprising:
   lowering said ABT by a first predetermined amount if said RSSI of said second base station is below said ABT.

5. The method as in claim 4 further comprising:
   periodically continuing to lower said ABT by said first predetermined amount if said RSSI of said second base station continues to be below said ABT, until said ABT reaches a first predetermined value.

6. The method as in claim 5 further comprising:
   lowering said ABT by a second predetermined amount if said RSSI of said second base station is below said ABT, once said ABT reaches said first predetermined value.

7. The method as in claim 6 further comprising:
   periodically continuing to lower said ABT by said second predetermined amount if said RSSI of said second base station continues to be below said ABT, until said ABT reaches a second predetermined value.

8. The method as in claim 7 further comprising:
   lowering said ABT by a third predetermined amount if said RSSI of said second base station is below said ABT, once said ABT reaches said second predetermined value.

9. The method as in claim 1 further comprising:
   adding said first base station to a congestion list, said congestion list containing base stations to which said wireless device will not attempt to roam.

10. The method as in claim 9 further comprising:
removing said first base station from said congestion list if said first base station is not found in a Neighbor List of available base stations for a predetermined period of time.

11. An apparatus for selecting a base station comprising:
congestion detection logic to detect a congestion condition at a first base station; and
anti-congestion logic to select the first base station if it is determined that a received signal strength ("RSSI") value of the first base station is higher than a RSSI value of a second base station, to select the second base station if the first base station having a higher RSSI value than said second base station, and it is detected that the first base station is congested as determined by average load on the first station over a period of time exceeding a predetermined threshold value, wherein the RSSI value of the second base station is above a specified alternate base station threshold ("ABT") value;
wherein said congestion detection logic determines said average load based on TrafNum values read from synchronization packets.

12. The apparatus as in claim 11 wherein, if said RSSI value of said second base station is initially below said ABT value, said anti-congestion logic lowers said ABT by a first predetermined amount.

13. The apparatus as in claim 12 wherein, if said RSSI value of said second base station continues to be below said ABT value, said anti-congestion logic periodically continues to lower said ABT by said first predetermined amount until said ABT reaches a first predetermined value.

14. The apparatus as in claim 13 wherein, if said RSSI value of said second base station continues to be below said ABT value, said anti-congestion logic lowers said ABT by a second predetermined amount, once said ABT reaches said first predetermined value.

15. The apparatus as in claim 14 further comprising:
The apparatus as in claim 13 wherein, if said RSSI value of said second base station continues to be below said ABT value, said anti-congestion logic periodically continues to lower said ABT by said second predetermined amount, until said ABT reaches a second predetermined value.

16. The apparatus as in claim 15 further comprising:
The apparatus as in claim 13 wherein, if said RSSI value of said second base station continues to be below said ABT value, said anti-congestion logic lowers said ABT by a third predetermined amount once said ABT reaches said second predetermined value.

17. The apparatus as in claim 11 wherein said anti-congestion logic adds said first base station to a congestion list upon selecting said second base station.

18. The apparatus as in claim 11 wherein said anti-congestion logic selects said second base station based on said second base station having a higher RSSI than any other base station except for said first base station.

19. A method comprising:
determining if a received signal strength ("RSSI") value received from a first base station is higher than a RSSI value received from a second base station;
defining a base station congestion condition; detecting if said congestion condition is met with respect to the first base station;
allocating a wireless device to the first base station if it is determined that the RSSI value received from the first base station is higher than the RSSI value received from the second base station;
allocating the second base station if it is determined that the RSSI value received from the first base station is higher than the RSSI value received from the second base station, and said congestion condition of the first base station is met, as long as the RSSI measured from said second base station is above a predetermined alternate base station threshold ("ABT") value; and
adding said first base station to a congestion list including one or more base stations to which said wireless device will not attempt to roam;
wherein said congestion condition comprises an average load on said first base station over a period of time being above a threshold value;
wherein said average load is measured based on concurrent TrafNum values read from synchronization packets.

20. The method as in claim 19 further comprising:
lowering said ABT by a first predetermined amount if said RSSI of said second base station is below said ABT.

21. The method as in claim 20 further comprising:
periodically continuing to lower said ABT by said first predetermined amount if said RSSI of said second base station continues to be below said ABT, until said ABT reaches a first predetermined value.

22. The method as in claim 21 further comprising:
lowering said ABT by a second predetermined amount if said ABT of said second base station is below said ABT, once said ABT reaches said first predetermined value.

23. The method as in claim 22 further comprising:
periodically continuing to lower said ABT by said second predetermined amount if said RSSI of said second base station continues to be below said ABT, until said ABT reaches a second predetermined value.

24. The method as in claim 23 further comprising:
lowering said ABT by a third predetermined amount if said RSSI of said second base station is below said ABT, once said ABT reaches said second predetermined value.

25. The method as in claim 19 further comprising:
removing said first base station from said congestion list if said first base station is not found in a Neighbor List of available base stations for a predetermined period of time.

* * * * *